Nov. 24, 1964  J. BRILLANT  3,158,023
METHOD AND MEANS FOR MEASURING PERMEABILITY IN SITU
Filed May 26, 1961  2 Sheets-Sheet 1
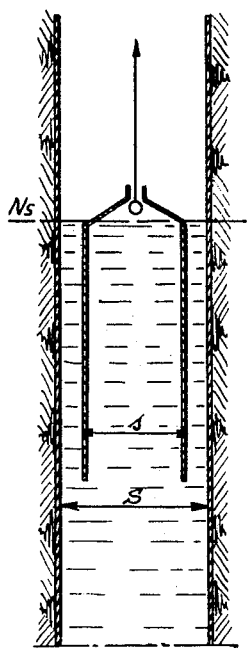
Fig.1
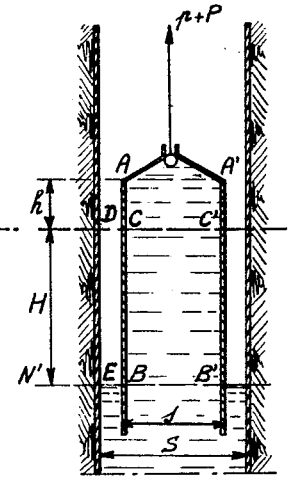
Fig.2
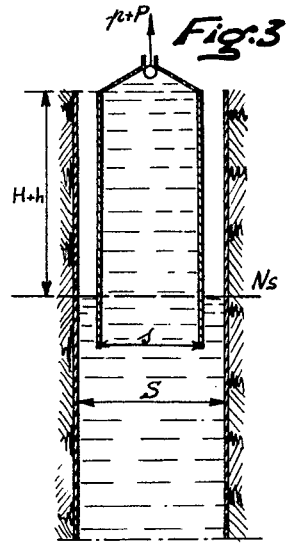
Fig.3
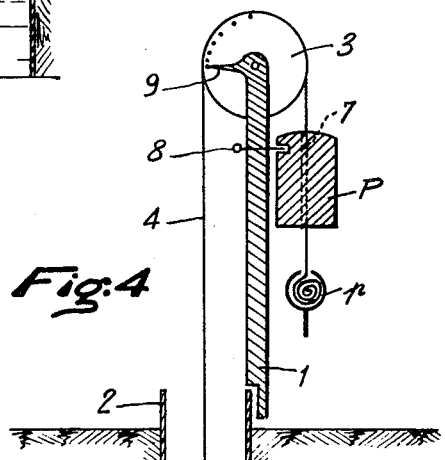
Fig.4
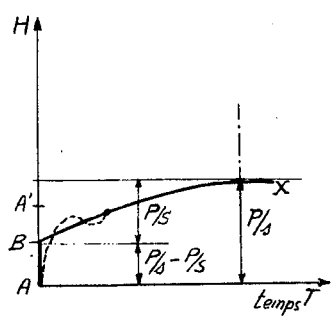
Fig.5
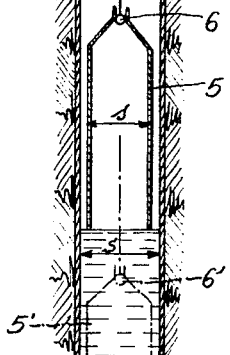

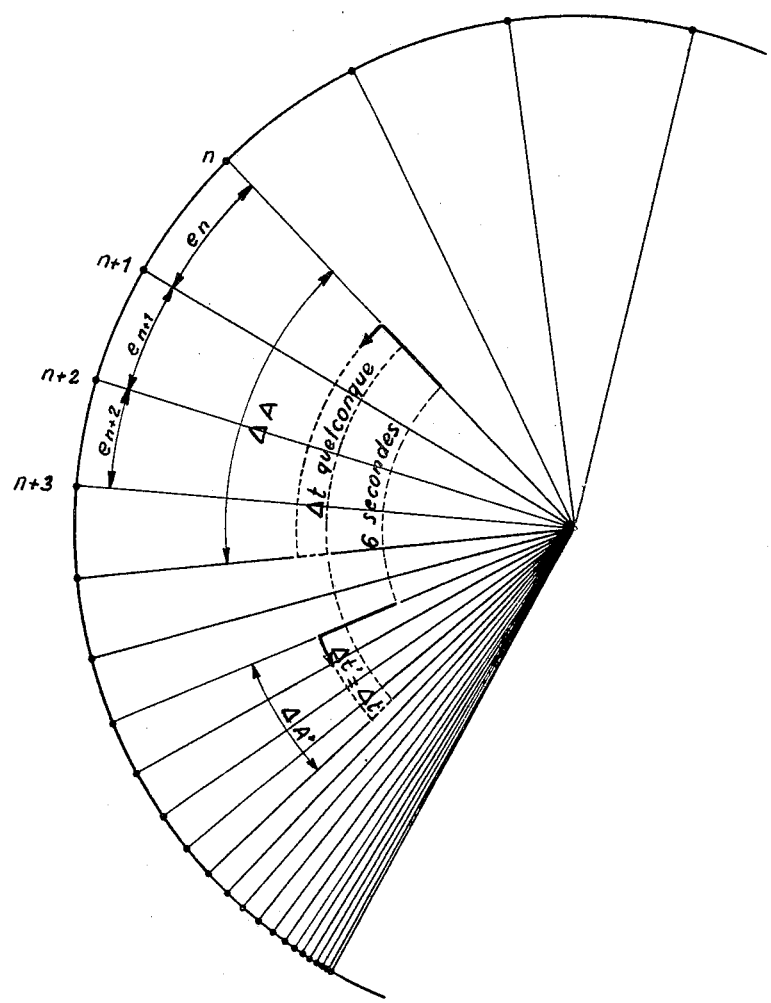

3,158,023
METHOD AND MEANS FOR MEASURING PERMEABILITY IN SITU
Jacques Brillant, Paris, France, assignor to Societe dite: Soletanche (Societe a responsabilite limitee), Paris, France
Filed May 26, 1961, Ser. No. 112,917
Claims priority, application France, June 1, 1960, 828,753, Patent 1,267,195
8 Claims. (Cl. 73—155)

The permeability or perviousness of ground may be estimated by determining the rate at which water must be pumped from a bore hole for maintaining a predetermined lowering of the water level therein.

More accurately, when measuring the flow of water through pervious media, assumed to follow Darcy's law, the relationship $Q=CHK$ is obtained which equation expresses that the volume Q of water pumped from the bore hole is proportional to the lowering of the water level H and to the perviousness K so that volume Q may be estimated as a function of said two magnitudes H and K when the coefficient C of proportionality may be theoretically or experimentally ascertained upon examination of the geometrical structure of the contacting surface between the water in the bore hole and the surrounding ground, said surface being protected by strainers.

Conversely, the measurement of the volume of water pumped and the sinking of the water level allows estimating K. This is the measurement "in situ" of permeability.

In order to operate speedily without requiring the continuous pumping of water, it is generally sufficient to remove a predetermined volume of water from the bore hole, and to measure the successive depths obtained during the gradual subsequent rising movement of the water level. Two successive measures H1 and H2 at the moments $t1$ and $t2$ are generally sufficient for the estimation:

Of the average lowering of the level $$H = \frac{H1 + H2}{2}$$

Of the corresponding pumped water volume $$Q = S \frac{H1 - H2}{t2 - t1}$$

S being the inner cross-section of the bore hole so that consequently $S(H1-H2)$ is a measure of the volume of water entering the bore hole during the time elapsed between $t2$ and $t1$.

The difficulty in the above method consists in proceeding speedily immediately after the removal of the water from the bore hole to effect a series of corresponding measurements of durations and levels (at least two measurements, and more if possible, are required for obtaining an average), since the rate of change of the level becomes progressively smaller and the estimation of the differences $H1-H2$ soon become impossible to measure with sufficient accuracy.

In order to remove such a drawback, the sampling or pumping operation is replaced in the apparatus according to the present invention by an upward tractional stress exerted on a downwardly opening bell which provides the same result, to wit the initial lowering of the water level in the bore hole, but the float is in position from the very beginning of operation so as to control an arrangement which can record the rising of water inside the bore hole.

Therefore, in accordance with the present invention, there is provided an apparatus including chiefly a floating bell suspended from a cable which is tensioned to effect closing of a valve at the upper end of the bell, an arrangement for exerting a traction or tension on said cable and for successively balancing the bell in lower and upper positions, and means for recording the movement of the bell which is balanced in its upper position, and accompanies the water as the latter rises in the bore hole.

The method to be employed with such apparatus is described hereinafter:

Further advantages and features of the invention will appear in the following detailed description of an illustrative embodiment which is to be read with reference to the accompanying drawings, wherein:

FIG. 1 shows diagrammatically the position of the bell in its lowermost immersed position where it is balanced before the beginning of the measuring operation;

FIG. 2 shows the bell in its upper balanced position to which it is moved by a traction force applied to the cable from which the bell is suspended;

FIG. 3 shows the position of the bell after restoration of the static water level;

FIG. 4 is a diagrammatic elevational view of the improved apparatus;

FIG. 5 is a diagram representing the movement of the bell with respect to time;

FIG. 6 is a diagrammatic view of a portion of a record obtained with the apparatus of FIG. 4.

Referring to the drawings in detail, it is apparent that in the example selected as an illustration of the invention, the apparatus is constituted chiefly (FIG. 4) by a frame 1 secured over the tube 2 lining the bore hole and carrying a transmission pulley 3 over which passes a cable 4. One end of the cable extends into the bore hole and carries a floating bell 5 in the general shape of a hollow cylinder. The bell 5 is open at its lower end and, at its upper end, has an orifice which is closed by a ball valve 6 upon traction being exerted on the cable connected to the valve. At its other end, the cable 4 carries counterweights p and P. The counterweight p is advantageously constituted by a more or less reeled extra length of the cable 4, and serves to balance the bell when the latter is in its initial lowermost position where it is fully submerged, as shown in broken lines at 5' on FIG. 4.

The bell in its uppermost position is balanced by the auxiliary counterweight P. The weight P is initially secured to the frame 1 by a disengageable stud 8 and is provided with a groove 7 inside which the cable 4 is engaged and clamped after the bell has been balanced in its lowermost position.

The apparatus further includes an arrangement for recording the rising movement of the bell accompanying the rising movement of the water level. Said recording arrangement includes chiefly a paper disc, for instance, secured to the pulley 3 and a stylus 9 rigid with the frame, engageable with the disc at predetermined uniform time intervals, for example, as established by a stop watch or other time piece the paper disc so as to mark on the latter, the successive positions of the pulley.

The operation of the apparatus is as follows:

(1) The bell is first caused to sink inside the bore hole, and is suspended from the cable which is held loosely by hand. As soon as the bell engages the water level, the ball valve 6 is released with reference to its seat and sinks alone down to the position shown at 6' in FIG. 4. The bell follows, as the air contained therein escapes, until the ball valve, which has been previously immersed, is again seated at the top of the bell. The cable is then fitted over the pulley, and the bell is balanced in its lower position by the counterweight p. The balance being thus obtained, the cable is fastened inside a groove of the counterweight P secured to the frame through the stud 8.

(2) The actual measuring stage is then started by releasing the weight P through disengagement of the stud 8. This leads to a loss of balance causing upward movement of the bell to the position shown on FIG. 2 which corresponds, before any entrance of water into the bore hole and assuming S and s designate the inner cross-section of the bore hole lining and the outer cross-section of the bell, respectively to a rising movement of the bell equal to $P/s$ above the static water level $N_s$, and to a lowering $P/S$ of the water level so that consequently, the actual relative rising of the bell above the water level is equal to $$\frac{P}{s} - \frac{P}{S}$$

In the illustration of the actual movement of the bell on the diagram of FIG. 5, it is apparent that in practice, the theoretical movement ABX is replaced by an oscillatory movement of a more or less damped character. In practice, the useful section of the diagram is limited to B'X corresponding to the time elapsing after the oscillations of the bell to either side of the second position of equilibrium have stopped. Said oscillations are decreased in magnitude and damped more quickly when the amplitude $$AB = \frac{P}{s} - \frac{P}{S}$$

defining the initial lack of equilibrium is decreased and the water is subjected to a more intense throttling between the bell and the bore hole lining, which indicates the advantage of providing a cross-section $s$ for the bell which is comparatively near that S of the bore hole lining, and practically this leads to a bell which fits, with a small clearance, within each bore hole lining.

It will also be noted that in the most unfavorable case, that is when the movement AB is instantaneous and not damped, the level of the rising bell reaches the point A' at a distance above A equal to twice AB.

Correspondingly, the movement of the bell with reference to the water level which was precedingly estimated as P would reach $2P/s$. In order to prevent any risk of the lower end of the bell rising above water level and thus emptying the bell, it would then be necessary to give it a length slightly above $2P/s$ which is substantially double the length required in the absence of any oscillations. This leads to the supplementary advantage of providing conditions of operation approximating critical damping with almost equal cross-sections $s$ and S.

In the absence of any damping, it is also possible to limit the bell to a length hardly larger than $P/s$, provided it includes at its lower end a fine metal gauze. Under such conditions, the bell no longer empties when rising above the water level with its valve closed, and there is no longer any risk of the valve being locked by foreign particles collecting at the surface of the water and carried inside the bell during its positioning.

After the bell has been raised to the position of FIG. 2, the operator proceeds to record the movement of the bell accompanying the rising of the water level, for instance by recording by way of the stylus 9 on a paper secured to the pulley 3 at successive seconds or other predetermined periods of time established by a watch or other time piece, whereby a document is obtained similar to the diagram shown in FIG. 6. On such diagram or chart, the angular distances $(en) - (en+1) - (en+2)$ etc. . . . between the successive record points $n$, $n+1$, $n+2$, are proportional to the rising movements executed during successive seconds.

In order to obtain a correct interpretation of the record, two rising movements $\Delta H$ and $\Delta H'$ should be considered which correspond to two equal time intervals during intervals $\Delta t$, and $\Delta t'$ differing by a time T.

It may be shown that:

$$\frac{T}{\log. \text{nep.} \Delta \frac{H}{H'}} = \text{constant}$$

Said constant R may be estimated in many manners on the diagram, the ratio $\Delta H / \Delta H'$ being equal to the ratio $\Delta A / \Delta A'$ of the angles travelled over by the pulley and which are proportional to $\Delta H$ and $\Delta H'$.

The permeability is consequently K:

$$K(m/s) = \frac{1}{R} \times \frac{S(\text{cm.}^2)}{C(m)} \times 10^{-4}$$

For instance, with the data obtained by the operator and recorded on the diagram of FIG. 6, with a strainer at a predetermined level while $S = 120$ sq. cm. and $C = 1.32$ meters, one would obtain:

$$\frac{\Delta A}{\Delta A'} = 2.5 \quad T = 6$$

$$R = \frac{6}{\log. \text{nep.} \ 2.5} = 6.55$$

so that the permeability of the ground for the bore hole considered at the strainer level is:

$$K = \frac{1}{10\ 000.\ 6.55} \cdot \frac{120}{1.32} = 1.4 \ 10^{-3}$$

Obviously, many modifications in shape and in various details may be considered as useful according to the applications or cases to be considered, and they may be incorporated in the apparatus described without unduly widening the scope of the invention as defined in the accompanying claims. In particular, the tractional stresses or forces on the cable 4 may be exerted otherwise than through counterweights which may be replaced for instance by springs, or by a suitable hydraulic, pneumatic, electric or electromagnetic arrangement.

What I claim is:

1. An apparatus for measuring the liquid permeability of earth formations having a bore hole therein containing water up to an initial level, said apparatus comprising
   (A) a downwardly opening bell having an opening of small cross-section at its upper end so as to be adapted to sink to a lower position of equilibrium in the bore hole and thereby become filled with water as air escapes from said bell through said opening,
   (B) means operative, after sinking of said bell, to continuously exert an upward pull of predetermined magnitude on said bell, thereby to raise said bell from said lower position of equilibrium to an upper position of equilibrium.
   (C) valve means operative to close said opening at the top of the bell in response to the exertion of said upward pull on the latter so that the water in said bell remains in the latter as the bell is raised to said upper position of equilibrium while the level of the water in the bore hole around said bell undergoes a corresponding transient decline below said initial level, and
   (D) means for periodically recording the upward movements of said bell from said upper position of equilibrium as water drains into the bore hole around said bell for return to said initial level.

2. An apparatus as in claim 1;
   wherein said means operative to exert an upward pull on the bell includes a cable from which said bell is suspended during raising of the latter, and a pulley rotatably mounted above the bore hole and having said cable running over said pulley so that the latter turns in response to upward movement of the bell; and
   wherein said means for periodically recording the upward movements of the bell is responsive to the corresponding angular displacements of said pulley.

3. An apparatus as in claim 2; wherein said means for recording the upward movements of the bell includes a record chart turnable with said pulley, and a recording stylus mounted at a fixed position adjacent said record chart and periodically movable against said chart to mark the latter.

4. An apparatus as in claim 1;
wherein said valve means includes a ball valve in said bell movable against the top end of the latter to close said opening; and
wherein said means operative to exert an upward pull on the bell includes a cable connected, at one end, to said ball valve to move the latter against said top end of the bell for simultaneously closing said opening and suspending said bell from said cable when an upward pull is transmitted through the latter.

5. An apparatus as in claim 4; wherein said means for periodically recording the upward movements of the bell includes a rotatable pulley over which said cable runs so that said pulley turns in response to said upward movements of the bell, a record chart turnable with said pulley, and a recording stylus mounted at a fixed position adjacent said record chart and being movable against said chart to mark the latter.

6. An apparatus as in claim 4; further comprising a fixed frame, a pulley rotatable on said frame and having said cable running over the pulley, and a first counterweight connected to said cable adjacent the end thereof remote from said bell to balance the latter in said lower position of equilibrium; and
wherein said means operative to exert an upward pull on the bell further includes a second counterweight releasably mounted on said frame and engageable with said cable to act on the latter upon release from the frame.

7. An apparatus as in claim 1; further comprising a fine mesh screen extending across the open bottom of said bell.

8. A method for measuring the liquid permeability of earth formations having a bore hole therein containing water up to an initial level, comprising immersing a downwardly open bell in the water in the bore hole so that the bell fills with water, thereafter continuously exerting an upward force of predetermined magnitude on the bell to raise the latter along with the water therein so that the water in the bore hole around the bell declines from the initial level, and periodically measuring the upward movements of the bell as water drains into the bore hole to return to said initial level around the bell, the speed of such upward movements being a function of the permeability of the earth formation.

References Cited in the file of this patent
UNITED STATES PATENTS

| | | |
|---|---|---|
| 1,208,026 | Smith | Dec. 12, 1916 |
| 2,540,096 | Bull | Feb. 6, 1951 |
| 2,557,488 | White | June 19, 1951 |
| 2,874,574 | Patureau | Feb. 24, 1959 |